United States Patent [19]

Young et al.

[11] Patent Number: 5,186,239
[45] Date of Patent: Feb. 16, 1993

[54] HEAT EXCHANGER WITH THERMAL STRESS RELIEVING ZONE

[75] Inventors: Darryl L. Young, Dearborn Heights; Josef Hirmann, Farmington Hills; Eugene E. Rhodes, Belleville, all of Mich.; David L. Brightwell, Brentwood, Great Britain

[73] Assignee: Ford Motor Company, Dearborn, Mich.

[21] Appl. No.: 829,115

[22] Filed: Jan. 30, 1992

[51] Int. Cl.⁵ .............................................. F28F 9/00
[52] U.S. Cl. ........................................ 165/81; 165/149
[58] Field of Search ................... 165/81–82, 165/149

[56] References Cited

U.S. PATENT DOCUMENTS

| 1,357,597 | 11/1920 | Springer | 165/149 |
|---|---|---|---|
| 1,735,807 | 11/1929 | Swank | 165/149 |
| 1,834,001 | 12/1931 | Modine | 165/81 X |
| 1,976,108 | 10/1934 | Young et al. | 165/81 X |
| 3,627,035 | 12/1971 | Astrup | 165/81 |
| 3,939,908 | 2/1976 | Chartet | 165/149 |
| 3,960,210 | 6/1976 | Chartet | 165/149 |
| 4,534,407 | 8/1985 | Lardner | 165/81 |
| 4,619,313 | 10/1986 | Rhodes et al. | 165/67 |
| 4,719,967 | 1/1988 | Scarselletta | |

Primary Examiner—Allen J. Flanigan
Attorney, Agent, or Firm—Raymond L. Coppiellie; Clifford L. Sadler

[57] ABSTRACT

A heat exchanger for an automotive vehicle is disclosed including a frame having a pair of headers and a pair of side supports disposed between the headers at opposite ends thereof. Each of the side supports includes a generally planar base and a pair of flanges extending from the based portion. The side supports including a thermal stress relieving zone defined by an elliptical aperture disposed in the based portion.

14 Claims, 5 Drawing Sheets

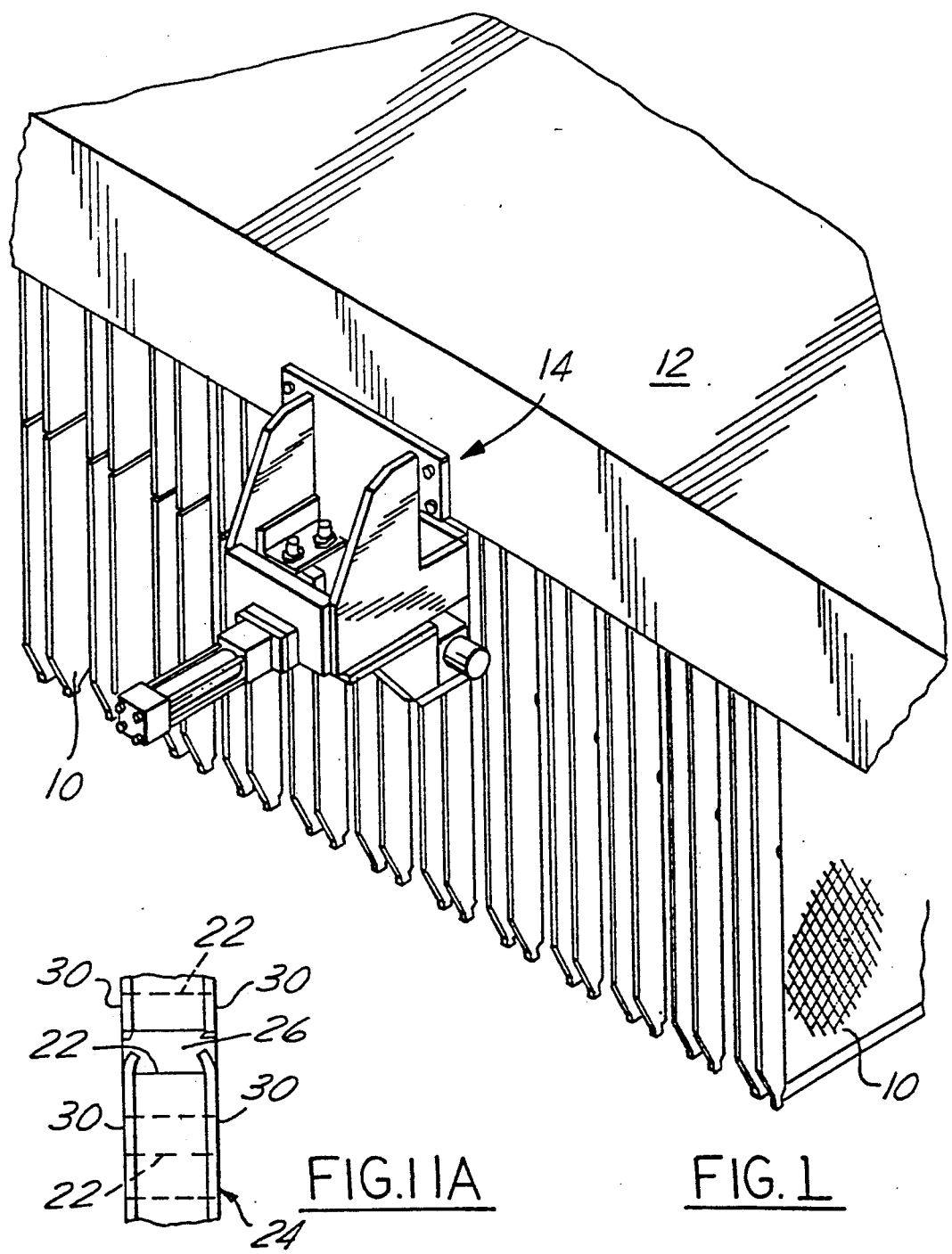
FIG. 1
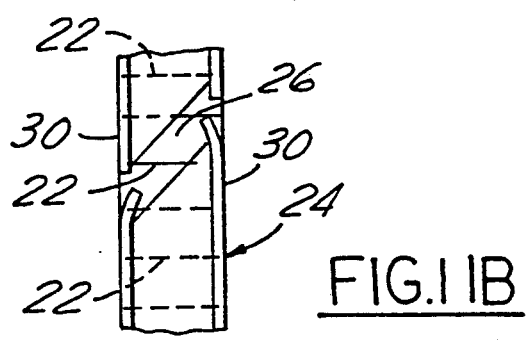
FIG. 11A
FIG. 11B

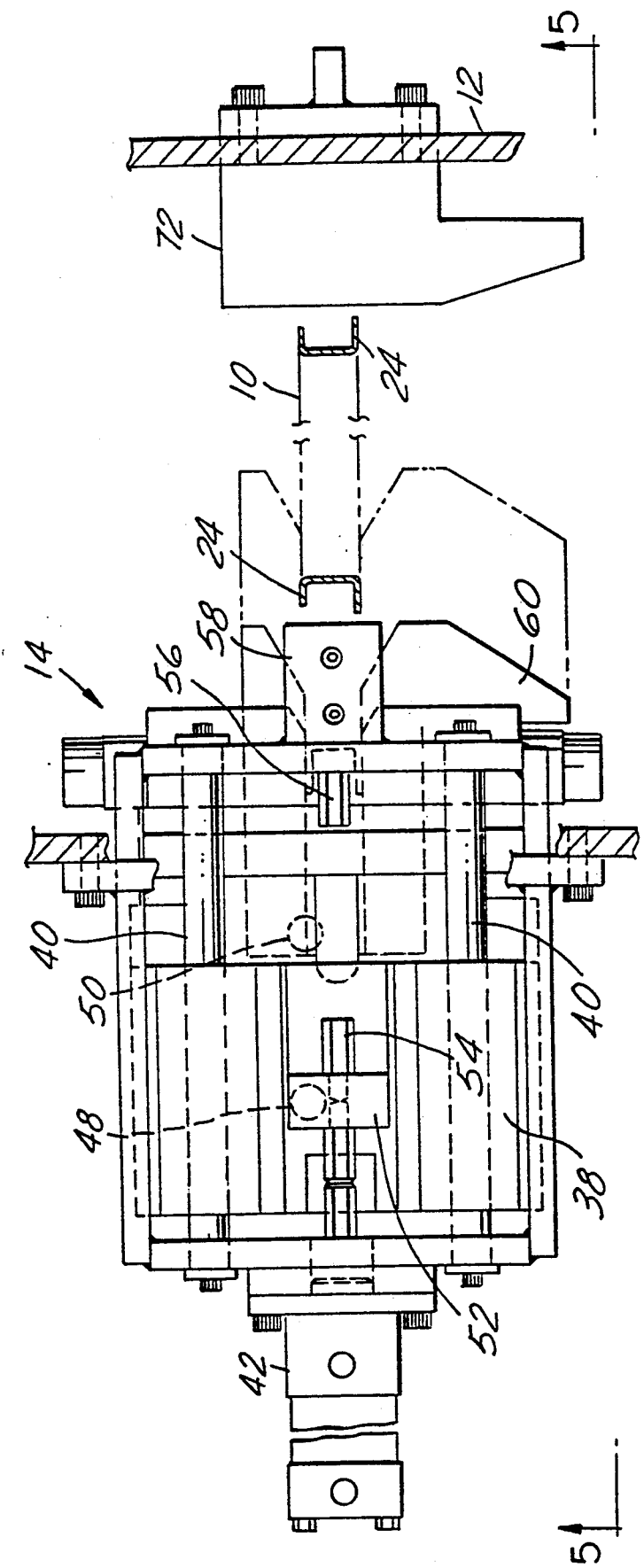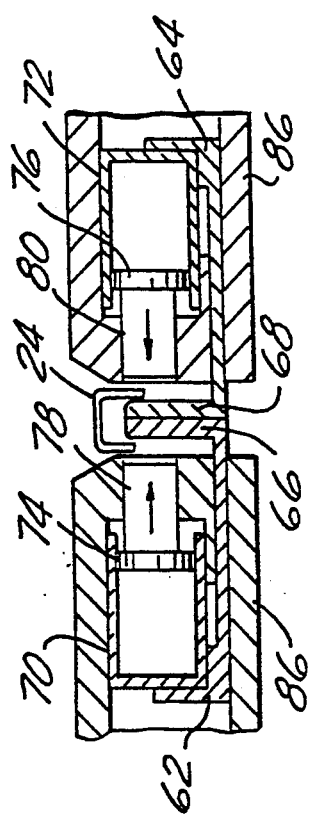
FIG.4
FIG.6

HEAT EXCHANGER WITH THERMAL STRESS RELIEVING ZONE

BACKGROUND OF THE INVENTION

1. Field of the Invention

The present invention relates generally to a heat exchanger for an automotive vehicle. More particularly, the present invention relates to an automotive heat exchanger core having a thermal stress-relieving zone therein.

2. Disclosure Information

Typical automotive heat exchangers, such as radiators, include a plurality of thin-walled tubes interleaved with corrugated fins enclosed in a core frame. The fins are rigidly attached to the tubes as well as to a pair of frame side supports while the tubes are joined to a pair of headers. The frame side supports are attached also to the headers. As is well known in the art, coolant passes from one header through the tubing to the other header. As the temperature of the coolant passing through the heat exchanger core increases, the core expands. The frame side supports, however, are not in direct heat contact with the liquid and, as such, do not heat at a proportional rate to the heating of the tubing. As a result of the expansion and contraction of the tubing, the side supports induce thermal stress in the tube-to-header joints during the thermal cycling of the heat exchanger, often leading to durability problems such as cracking or leaking of the tubes.

To overcome this thermal cycling problem and to increase the durability of the heat exchanger core, it is known in the art to relieve the thermally-induced stress by saw cutting the side supports following brazing of the core and prior to placing the heat exchanger core into service. However, the saw cutting operation is difficult to automate, is excessively loud, and produces a tremendous amount of metal fines resulting in increased downtime and increased maintenance of the saw.

Other methods have been proposed to relieve the thermally-induced stress in the heat exchanger core without the need for saw cutting the side supports. For example, U.S. Pat. No. 4,719,967 proposes the use of a "T-shaped" or "I-shaped" slot or piercing stamped into the core reinforcement prior to forming the reinforcement into a channel member. After brazing the core assembly, the reinforcement is fractured at the perforation to allow for expansion of the core during thermal cycling of the heat exchanger. The use of such a "T-shaped" or "I-shaped" perforation may be difficult to maintain since the perforation may fill up with filler metal such as cladding or solder during the brazing of the core and may also prematurely fracture upon bending the reinforcement into its channel shape. Furthermore, U.S. Pat. No. 4,719,967 does not suggest any apparatus for performing the fracturing of the core reinforcement. Therefore, it would be advantageous to provide a simpler and less complex perforation design to avoid these problems.

It is an object of the present invention to provide a heat exchanger having a core including a side support defining a thermal stress-relieving zone therein which maintains core rigidity during assembly and brazing of the heat exchanger core while offering an efficient and simple means to relieve thermally-induced stress experienced by the heat exchanger.

It is further an object of the present invention to provide a thermal stress-relieving zone which does not become occluded with brazing materials during the manufacture of the heat exchanger core.

SUMMARY OF THE INVENTION

The present invention overcomes the problems associated with the prior art by providing a heat exchanger for an automotive vehicle comprising a frame including a pair of headers and a pair of side supports disposed between the headers at opposite ends thereof, each of the side supports having a generally planar base portion and a pair of flanges extending generally perpendicularly to the plane of the base portion. The side supports include a thermal stress-relieving zone defined by an elliptical aperture disposed in said base portion. In one embodiment of the present invention, the elliptical aperture includes a major axis extending generally perpendicularly to the longitudinal axis of the side support and extends across the base portion of the side support and partially into each of the flanges. In an alternative embodiment of the present invention, the major axis of the elliptical aperture extends at an angle of approximately 30°-60° to the horizontal access of the base portion of the side support. The flanges of the side support shear upon imposition of a generally perpendicular force thereagainst proximate the elliptical aperture such that the side support is completely fractured at the aperture.

There is also disclosed herein a method of producing an automotive heat exchanger having thermal stress-relieving zone therein comprising the steps of assembling a heat exchanger core, the core having a frame including a pair of headers and a pair of side supports disposed between the headers. Each of the side supports includes a generally planar base portion and a pair of flanges extending generally perpendicularly to the plane of the base and including an elliptical aperture disposed in the base portion. The method further comprises the steps of supporting the assembled heat exchanger cores on conveying means for transporting the heat exchanger cores to a work station; securing the heat exchanger against movement at the work station; engaging at least one of the side supports proximate the elliptical aperture with tool means for shearing the flanges of the side support; and actuating the tool means to provide a shearing force against the flanges of the side support until the flanges are completely fractured to produce the thermal stress-relieving zone.

These and other objects, features and advantages of the present invention will be readily apparent from the drawings, detailed description and claims which follow.

BRIEF DESCRIPTION OF THE DRAWINGS

FIG. 1 is a perspective view of a plurality of heat exchanger cores on a conveyor line and a shearing apparatus in engagement with one of the cores.

FIG. 4 is a top plan view of the shearing apparatus of FIG. 1.

FIG. 6 is a cross-sectional view of the C-shaped yoke member of the present invention taken along line 6—6 of FIG. 5.

FIGS. 11A and B are partial elevational views of alternative embodiments of core side supports showing stress-relieving zones produced therein.

DETAILED DESCRIPTION OF THE PREFERRED EMBODIMENTS

Figure 2:
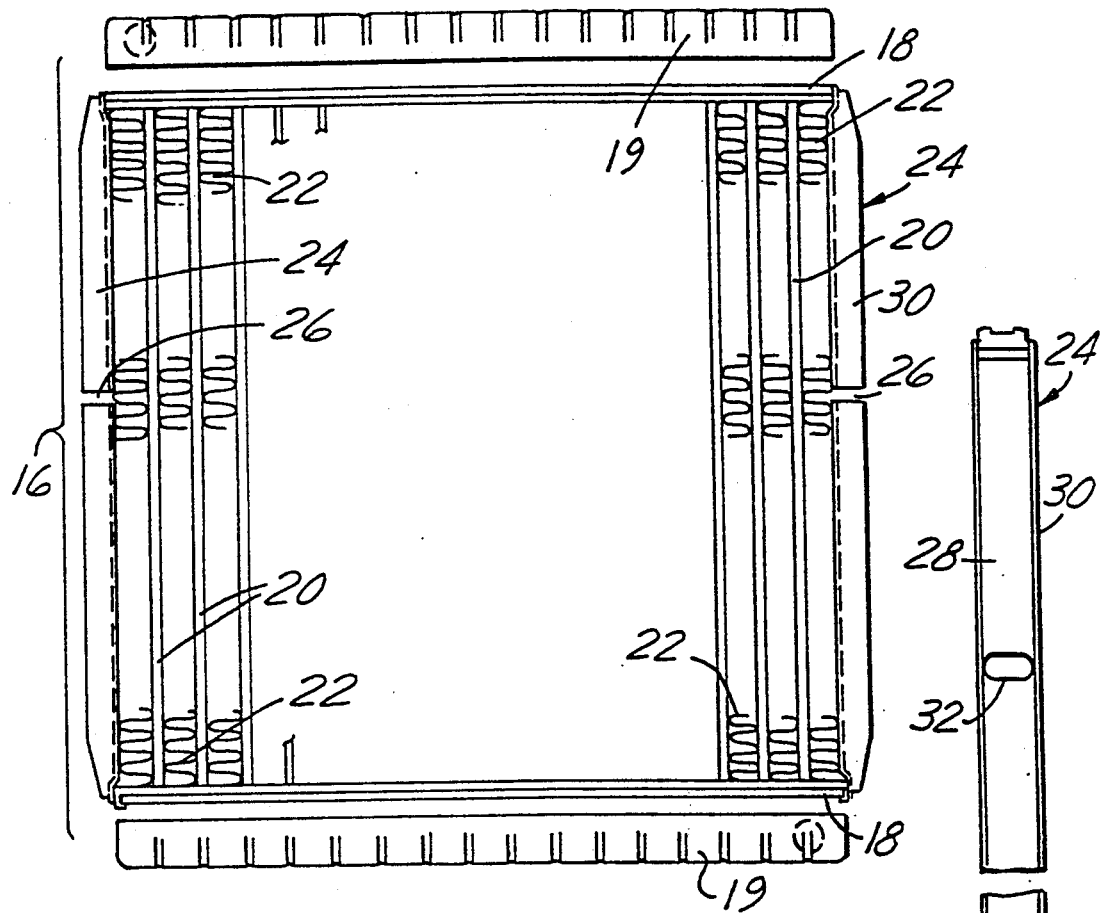
FIG. 2 is an exploded, perspective view of a heat exchanger core structured in accord with the principles of the present invention.

Referring now to the drawings, FIG. 1 shows a plurality of heat exchanger cores, most commonly radiator cores for an automotive vehicle supported in a conveyor assembly. The radiator cores 10 may be supported in any of a number of known methods, such as by clamps, hooks or other temporary fastening devices readily available to those skilled in the art. The radiator cores 10 may also be supported on the conveyor assembly by sliding one end of the radiator core into an engagement slot formed in the movable conveyor line such that the radiator core is supported in the slot. A shearing apparatus 14 engages the radiator cores 10 and produces a thermal stress-relieving zone in a side support of the core. As shown in FIG. 1, the shearing apparatus 14 may be connected to a frame 12 above the conveyor assembly and brought into engagement with the radiator cores 10 as the cores 10 move into the appropriate position or alternatively may be a free-standing unit manually loaded and unloaded by an operator. As will be discussed in greater detail below, the apparatus 14 includes a relatively rigid frame portion and shearing tool which reciprocates axially relative to the frame portion to engage the side of the radiator core 10 to produce a thermal stress relieving zone in the core.

FIG. 2 shows an automotive radiator structured in accordance with the principles of the present invention. The radiator 16 includes the radiator core 10 and a pair of headers 18 and tank assemblies 19 disposed at opposite ends of the core 10. The core 10 further includes a plurality of thin walled, oval tubes 20 attached to the header and tank assemblies 18 as well as a plurality of corrugated fins 22 interposed between rows of tubes 20. A pair of core side supports 24 disposed at opposite ends of the headers 18 complete the core assembly 10. As can be seen in FIG. 2, a row of corrugated fins is adjacent each side support 24. The side supports 24 each include a stress-relieving zone 26 which allows for the thermal expansion and contraction of the core assembly without excessively stressing the tubes 20 or the fins 22, thereby increasing the life expectancy of the core 10. The stress relieving zones 26 are produced by the shearing apparatus 14 shown in FIG. 1 and a method which will be described in greater detail below. The radiator core 10 may be formed of any of a number of materials, such as aluminum or other known materials commonly used in the heat exchanger art.

Figure 3C:
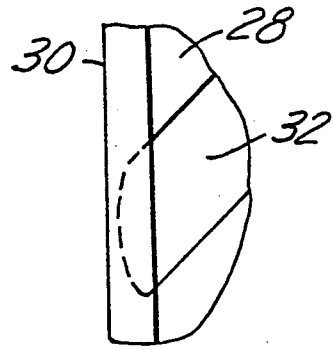
FIG. 3C is an enlarged view of a portion of FIG. 3B.
Figure 3B:
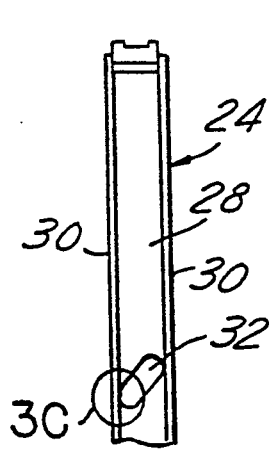
FIGS. 3A and B are side elevational views of alternative embodiments of side supports of the heat exchanger core of FIG. 2.
Figure 3A:
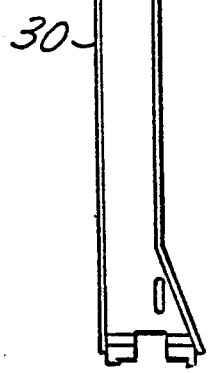

FIGS. 3A and B show elevational views of two different embodiments of side supports 24 of the present invention. The side support 24 comprises a U-shaped channel member having a base portion 28 and a pair of flanges 30 extending generally perpendicularly to the plane of the base portion 28. Prior to assembling the radiator core, each side support includes an elliptical aperture 32 formed therein through a stamping operation prior to forming the flanges 30. As can be seen in the drawings, the term "elliptical" is not meant to be limited to a strict geometric definition of the term, but instead refers to an oval- or oblong-shaped aperture or slot. In FIG. 3A, the major axis of the elliptical aperture 32 is disposed generally perpendicularly to the longitudinal axis of the side support 24. In FIG. 3B, the major axis of the elliptical aperture 32 is disposed at an angle of approximately 45° to the longitudinal axis of the side support. The present invention contemplates that the elliptical aperture 32 may be placed at an angle of between 30° and 60° to the longitudinal axis of the support member 24 with an angle of 45° producing the most effective results in terms of retaining the structural rigidity of the core while still allowing the core to expand and contract during the thermal cycling. As can be seen in the enlarged portion of FIG. 3B, the elliptical aperture extends into a portion of each of the flanges 30. The side supports are also formed of any of a number of known materials, such as aluminum or steel and the apertures have typical dimensions of ⅜ inches by 1.0 inches. Obviously, other sized elliptical apertures can be utilized within the present invention. The advantages of placing the elliptical aperture at a 45° angle will become apparent below.

Figure 5:
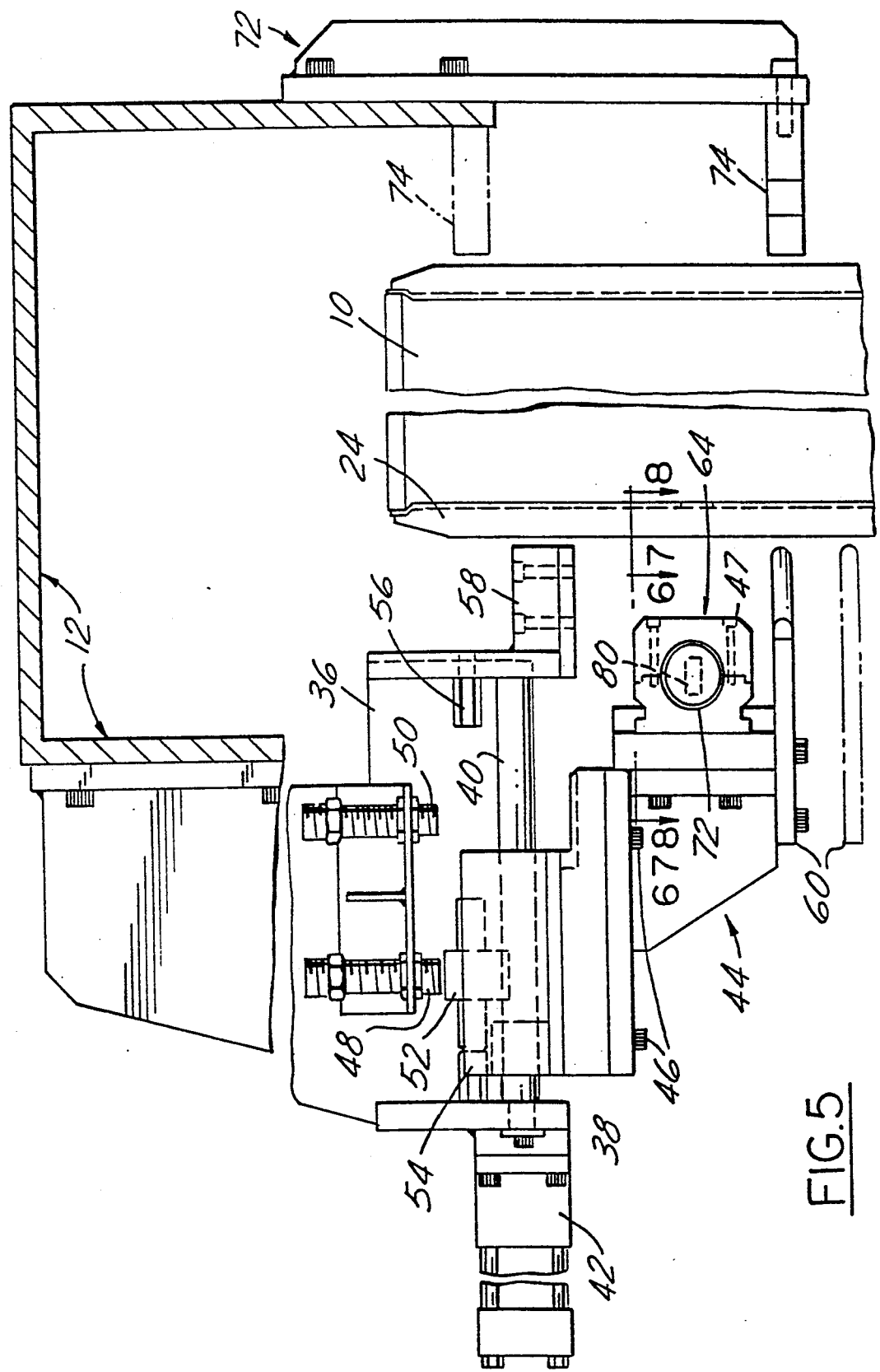
FIG. 5 is a cross-sectional view of the shearing apparatus taken along line 5—5 of FIG. 4.

In order to produce the stress relieving zones 26 in the finished radiator 16, the radiator core 10 is first assembled using the side supports 24 with the elliptical apertures 32 stamped therein. The core 10 comprising the headers, tubes, fins and side supports are stacked together and banded or fixtured for brazing in a known manner. The brazed cores 10 are then placed on the conveyor line, such as described above, and are then transported to a work station wherein the shearing apparatus 14 engages a side support 24 to fracture the side support to produce the stress-relieving zone 26. FIGS. 4 and 5 show the shearing apparatus 14 in detail.

The shearing apparatus 14 comprises a generally rigid frame structure 36 which supports a carriage 38. Carriage 38 reciprocates axially on a pair of slides 40. An actuating mechanism 42, such as an electric motor, a hydraulic, or a pneumatic circuit causes carriage 38 to reciprocate axially along slides 40. A shearing tool 44 is rigidly secured to carriage 38 by fasteners 46.

The frame structure 36 further includes a pair of position sensors 48, 50 which cooperate with a locator block 52 to signal the actuating mechanism 42 when the shearing tool 44 is in the correct position to shear the side support 24 of the radiator core 10 without damaging the outermost row of fins 22 of the core 10. The position sensors 48, 50 may be any of a number of known and commercially available types of position sensors. The frame member 36 also includes a stop member 56 and a release block 58. Stop member 56 engages an adjustment block 54 to stop movement of the carriage 38 upon initiation of the shearing process. At this position, the position sensor 50 signals the actuating mechanism 42 or alternatively a microprocessor associated with the shearing apparatus when the axial motion is completed so that the next operation in the shearing process begins. When the shearing process is complete, the carriage 38 reciprocates away from the radiator core 10. The release block 58 insures that the core 10 does not remain in the shearing tool 44 when the tool 44 makes its return stroke.

A pair of guide members 60 attached to the shearing tool 44 provide alignment guidance for the shearing tool 44 when the carriage is reciprocated axially toward the radiator core 10. A pair of C-shaped yoke members 62, 64 surrounds both flanges 30 of the side support 24 upon engagement of the shearing tool 44 with the support 24. As can be seen in greater detail in FIG. 6, each C-shaped yoke member 62, 64 comprises a die portion 66, 68 rigidly secured to a cylinder 70, 72 respectively. The cylinders 70, 72 define an interior volume for receiving fluid therein, such as hydraulic fluid or compressed air. A piston 74, 76 reciprocates axially in each cylinder 70, 72 respectively, upon addition or deletion of fluid to the cylinder. A punch 78, 80 is connected to each piston 74, 76, the punches engaging the flanges of the side support 24 and shearing them when the cylinders 70, 72 are pressurized as will be described below in FIGS. 7-9. A bearing 82, 84 may also surround a portion of each punch 78, 80 so that the punch does not bind during reciprocation in the cylinder. The C-shaped yoke members 62, 64 are not restrained relative to base 86 such that when the cylinder is pressurized with fluid, the piston and punch assembly reciprocate in a direction generally perpendicular to the plane of the flanges toward the flange of the side support while simultaneously, the die portions of the yoke reciprocate in an opposite direction (as shown by the arrows). A biasing means, such as spring 88 returns the yoke members 62, 64 when the cylinder is depressurized. The pistons, punches, and the first and second die portions of the C-shaped yoke members 62, 64 comprise shearing means for shearing the flanges 30 of the side support 24.

The frame structure 36 of the shearing apparatus 14 also includes a reinforcement support tool 72 having a pair of stop members 74 secured thereto. The stop members 74 prevent the lateral movement of the radiator cores 10 in direction parallel to the axial movement of the shearing tool 44 upon engagement of the cores with the shearing tool. As shown in FIG. 5, the reinforcement support tool 72 is rigidly connected to the frame of the shearing apparatus 14. The frame structure 36 in conjunction with stop member 74 and reinforcement support tool 72 comprise support means for receiving and supporting the heat exchanger core during the shearing process.

Figure 7:
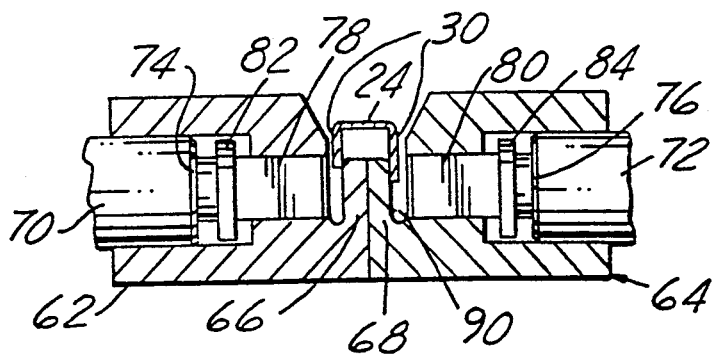
FIG. 7 is a cross-sectional view of the shearing apparatus taken along line 7—7 of FIG. 5 prior to engagement of the apparatus with the core side support.
Figure 8:
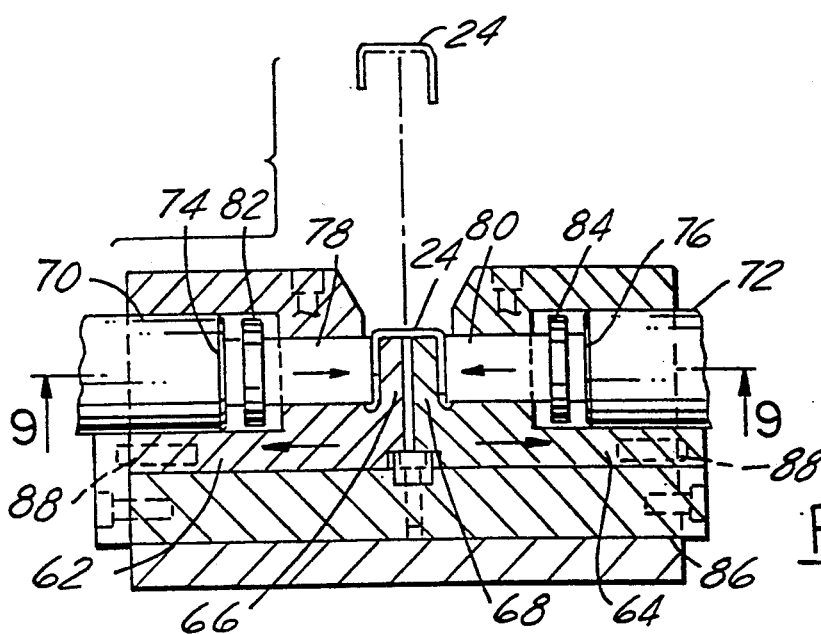
FIG. 8 is a cross-sectional view of the shearing apparatus taken along line 8—8 of FIG. 5 with the apparatus in engagement with the core side support.
Figure 9:
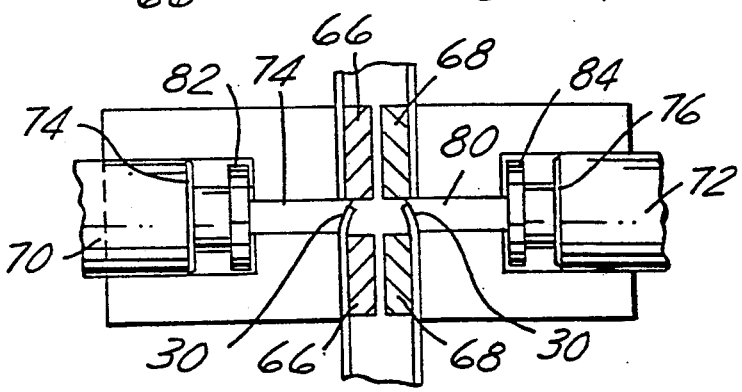
FIG. 9 is a cross-sectional view taken along line 9—9 of FIG. 8 after engagement of the shearing apparatus with the core side support.

FIGS. 7-9 show the operation of the shearing apparatus 14 and the method of producing the thermal stress-relieving zone in the radiator core 10. As shown in FIG. 6, the first and second die portions 66, 68 of yoke members 62, 64 are adjacent to each other and cooperate to form a channel receiving slot 90. After the radiator core 10 has been assembled according to a known method, the radiator core 10 is transported to a work station via the conveyor assembly wherein the shearing tool 44 reciprocates axially to engage the side support 24 of the core 10. The C-shaped yoke members 62, 64 reciprocates toward the side support 24 so that the side support 24 engages the channel receiving slot 90. As shown in FIG. 7, each of the pistons 74, 76 and their associated punches 78, 80 are in a first position not in engagement with the side support 24. It is important to note that the first and second die members 66, 68, engage the channel formed by the flanges 30 and the base portion 28 of the side support 24 as further shown in FIG. 8.

In FIG. 8, the pistons 74, 76 and punches 78, 80, are actuated so that the punches contact the flanges 30 of the side support in a direction generally perpendicular to the plane of the flanges 30. As will be readily apparent to those skilled in the art, the pistons can be either electrically actuated, pneumatically actuated or hydraulically actuated. As explained above, as each of the cylinders are pressurized, the punches 78, 80 are moved in a direction toward each other and in further contact with the flanges 30 of the side support, and each of the first and second die members 66 68, are reciprocated in a direction opposite to the direction of movement of the punches as shown by the arrows in FIG. 8. Reciprocating the punches 78, 80 and the die members 66, 68, respectively, in opposite directions causes shearing of the side support flanges 30 at the location of the elliptical aperture. This is shown in FIG. 9. By shearing the flanges 30 of the side support 24 at the elliptical aperture, the side support is completely fractured at that predetermined position allowing for expansion and contraction of the radiator core during thermal cycling with minimal adverse consequences.

As shown in FIG. 9, the flanges 30 in contact with the punches are sheared in toward the longitudinal center line of the side support 24 while the flanges immediately thereabove remain straight. After the shearing of the flanges has occurred, the first and second die members 66, 68 and punches 78, 80 are returned to their first position and the radiator core 10 is withdrawn from the C-shaped yoke members 62, 64. The radiator core 10 is then taken to an additional work station wherein the tank assemblies are attached to the headers by known processes. Alternatively, the tanks may be joined to the headers prior to the shearing of the side supports.

Figure 10:
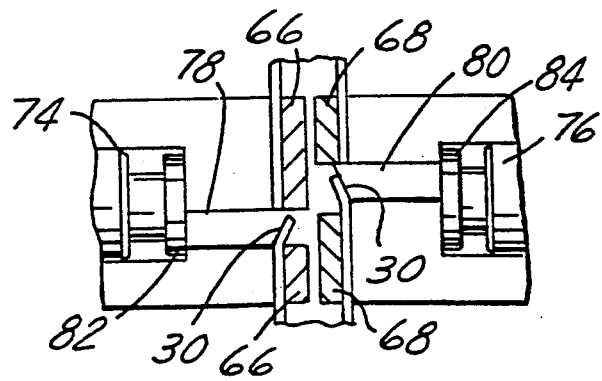
FIG. 10 is an alternative embodiment of the shearing apparatus of FIG. 1 similar to FIG. 9.

FIG. 10 shows an alternative embodiment of the location of the punches for accommodating a side support 24 having an elliptical aperture disposed at a 45° angle. The punches 78, 80 are not diametrically opposed to each other but are offset by a predetermined amount to correspond with the elliptical aperture at its predetermined angle.

FIGS. 11A and B show enlargements of the side supports 24 in the location of the stress-relieving zones 26 after the side support 24 has been sheared with the apparatus and according to the method of the present invention. In FIGS. 11A and B, the corrugated fins adjacent the side support 24 are shown in phantom. FIG. 11A shows a side support 24 with a horizontal stress-relieving zone 26 of predetermined length. In FIG. 11A, at least one corrugation of the fins 22 in the vicinity of the stress-relieving zone 26 is completely free of the side support base portion 28. FIG. 11B shows the advantages of locating the elliptical aperture 32 at a predetermined angle. In FIG. 11B, the corrugated fin 22 contacts the side support member 24 along at least some portion of its length and does not leave any corrugation completely without contact to the base portion 28 of the side support 24 as does the embodiment in FIG. 11A. This increases the structural rigidity of the core 10 while still providing expansion and contraction during thermal cycling. This also makes the pre-brazed radiator assembly more rigid while increasing the burst pressure of the final assembled core.

Various other modifications and alternative embodiments to the present invention may be readily apparent to those skilled in the art. For example, the radiator shown in FIG. 2 includes a stress-relieving zone in each of the side supports 24. It may be preferable in certain situations to provide a stress-relieving zone in only one of the side supports or, perhaps, in a plurality of locations along one side support. Also, the configuration of the punches used to shear the side supports may take any of a number of known shapes and configurations, it being apparent to those skilled in the art that the optimal shape will be defined by the required stress-relieving zone configuration. Therefore, it is the following claims, including all equivalents, which define the scope of our invention.

What is claimed is:

1. A heat exchanger for an automotive vehicle, comprising:
a frame including a pair of headers interconnected by a heat exchange fluid conduit and a pair of side supports disposed between said headers at opposite ends of said headers, each of said side supports including a generally planar base portion having a horizontal axis and a pair of flanges extending generally perpendicularly to the plane of said base portion, said side supports having a longitudinal axis and including a thermal stress relieving zone defined by an oblong-shaped slot disposed in said base portion, said oblong-shaped slot including a major axis extending at an angle of approximately 30–60 degrees to the horizontal axis of said base portion of said side support.

2. A heat exchanger according to claim 1, wherein said oblong-shaped slot includes a major axis extending generally perpendicularly to the longitudinal axis of said side support.

3. A heat exchanger according to claim 2, wherein said oblong-shaped slot extends substantially across said base portion.

4. A heat exchanger according to claim 1, wherein said oblong-shaped slot extends across said base portion and partially extends into each of said flanges.

5. A heat exchanger according to claim 1, wherein said oblong-shaped slot includes a major axis extending at an angle of approximately 45 degrees to the horizontal axis of said base portion of said side support.

6. A heat exchanger according to claim 1, wherein said flanges are operative to shear upon imposition of a generally perpendicular force there against proximate said stress relieving zone such that said side support is completely fractured at said stress relieving zone.

7. A heat exchanger according to claim 1, wherein said side supports including said oblong-shaped slot are stamped from a deformable metal blank.

8. A heat exchanger according to claim 1, wherein said heat exchanger comprises an automotive radiator.

9. A heat exchanger for an automotive vehicle, comprising:
a pair of headers;
a plurality of tubular elements having opposite ends connected to each of the headers and defining air paths between adjacent pairs of tubular elements;
a plurality of fin elements provided in said air paths; and
a pair of channel-shaped side supports disposed between said headers at opposite ends of said headers, each of said side supports having a longitudinal axis and including a generally planar base portion having a horizontal axis and a pair of flanges extending generally perpendicularly to the plane of said base portion, said side supports including a thermal stress relieving zone defined by an oblong-shaped slot disposed in said base portion, said slot having a major axis extending generally perpendicularly to the longitudinal axis of said side support, and wherein said flanges are operative to shear upon imposition of a generally perpendicular force thereagainst proximate said stress relieving zone such that said side support is completely fractured at said stress relieving zone.

10. A heat exchanger according to claim 9, wherein said oblong-shaped slot extends substantially across said base portion.

11. A heat exchanger according to claim 9, wherein said major axis of said oblong-shaped slot extends at an angle of approximately 30–60 degrees to the horizontal axis of said base portion of said side support.

12. A heat exchanger according to claim 9, wherein said major axis of said oblong-shaped slot extends at an angle of approximately 45 degrees to the horizontal axis of said base portion of said side support.

13. A heat exchanger according to claim 9, wherein said heat exchanger comprises an automotive radiator.

14. A radiator for an automotive vehicle, comprising:
a pair of headers;
a plurality of tubular elements having opposite ends connected to each of the headers and defining air paths between adjacent pair of tubular elements;
a plurality of fin elements provided in said air paths; and
a pair of channel-shaped side supports disposed between said headers at opposite ends of said headers, each of said side supports having a generally planar base portion with a horizontal axis and a pair of flanges extending generally perpendicularly to the plane of said base portion, said side supports including an oblong-shaped slot extending substantially across said base portion and having a major axis extending at an angle of approximately 45 degrees to the horizontal axis of said base portion such that upon imposition of a shear force against said flanges proximate said slot, said flanges are completely sheared relative to said base portion so that said side support is completely fractured at said slot.

* * * * *